United States Patent [19]

Ross

[11] Patent Number: 5,521,257

[45] Date of Patent: May 28, 1996

[54] HYDROLYSIS OF POLYSUCCINIMIDE TO PRODUCE LOW-COLOR POLYASPARTIC ACID AND SALTS THEREOF

[75] Inventor: Robert J. Ross, Elmhurst, Ill.

[73] Assignee: Donlar Corporation, Bedford Park, Ill.

[21] Appl. No.: 367,734

[22] Filed: Jan. 3, 1995

[51] Int. Cl.$^6$ .......................... C08G 69/00; C08G 69/10
[52] U.S. Cl. ............................. 525/420; 525/421
[58] Field of Search ...................... 525/420, 421

[56] References Cited

U.S. PATENT DOCUMENTS

| | | | |
|---|---|---|---|
| 4,363,797 | 12/1982 | Jacquet et al. | 424/70 |
| 5,057,597 | 10/1991 | Koskan | 528/328 |
| 5,152,902 | 10/1992 | Koskan et al. | 210/698 |
| 5,288,783 | 2/1994 | Wood | 525/418 |
| 5,292,864 | 3/1994 | Wood et al. | 528/490 |
| 5,373,086 | 12/1994 | Koskan et al. | 528/328 |
| 5,373,088 | 12/1994 | Koskan et al. | 528/363 |
| 5,408,029 | 4/1995 | Wood et al. | 528/328 |

Primary Examiner—Ana L. Carrillo
Attorney, Agent, or Firm—Olson & Hierl, Ltd.

[57] ABSTRACT

Low-color polyaspartate homopolymers, copolymers or homopolymer/copolymer mixtures and the metal salts thereof, are produced by the oxidative, hydrolysis of polysuccinimide homopolymers, copolymers or homopolymer/copolymer mixtures, and metal salts thereof, in the presence of selected chlorine-free, non-chromogenic oxygen containing oxidizing agents. The preferred oxidizing agents are selected from the group consisting of hydrogen peroxide, sodium percarbonate, potassium percarbonate, sodium perborate tetrahydrate, sodium perborate monohydrate, sodium periodate, potassium periodate and peroxycarboxylic acids. The advantage of the claimed process is that low-color polyaspartates can be produced without the addition of further processing steps beyond the hydrolysis of the polysuccinimide presursor. Solid, low-color polyaspartates are obtained by evaporating to dryness the polyaspartate solutions obtained after oxidative hydrolysis.

9 Claims, 3 Drawing Sheets

HYDROLYSIS OF POLYSUCCINIMIDE TO PRODUCE LOW-COLOR POLYASPARTIC ACID AND SALTS THEREOF

FIELD OF THE INVENTION

This invention relates to a process for the production of low-color polyaspartic acid homopolymer, copolymer and homopolymer/copolymer mixtures, and metal salts thereof, by the hydrolysis of polysuccinimide homopolymers, copolymers and homopolymer/copolymer mixtures in the presence of an oxidizing agent.

BACKGROUND OF THE INVENTION

Polysuccinimide and polysuccinimide copolymers are precursors of polyaspartic acid and polyaspartic acid copolymers. Both, as homopolymers and as copolymers, have been formed by a number of methods or processes known in the art. The term "polyaspartic acid" as used herein refers to the free acid and to metal salts of polyaspartic acid regardless of whether the acid or metal salt thereof is a homopolymer, copolymer or a mixture of homopolymers and copolymers. Polyaspartic acid is used in a wide variety of applications such as an antideposition agent, as a plant nutrient uptake facilitator and in personal care products.

Poly-$\alpha,\beta$-D,L-aspartic acid, copolymers of poly-$\alpha,\beta$-D,L-aspartic acid and their salts are generally water soluble, biodegradable polymers useful in a variety of applications such as in water treatment, detergent formulations, oral hygiene products, agriculture, personal care products such as hair and skin care toiletries, and in cosmetics. In many of these applications, highly colored components in the polyaspartic acid or solutions thereof are to be avoided because they impart undesirable color characteristics to the final commercial product.

The processes for the manufacture of polyaspartic acid usually involve two steps. The first step is the polymerization of a monomer such as aspartic acid, monoammonium maleate or maleamic acid to afford polysuccinimide. A copolymer can be formed by polymerization of the above monomers with a co-monomer familiar to those skilled in the art. A mixture of homopolymer and copolymer can be prepared by adjusting the quantities of monomer and co-monomer used in the polymerization reaction or by mixing a homopolymer with a copolymer.

The second step involves the hydrolysis of the polysuccinimide homopolymer or copolymer, or mixtures of homopolymer and copolymer, or metal salts thereof, with aqueous base or saturated steam to afford a polyaspartate homopolymer or copolymer, or mixtures, or metal salts thereof. For base hydrolysis, the polysuccinimide reaction product is typically combined with aqueous ammonium hydroxide, sodium hydroxide, sodium carbonate and the like.

The base hydrolysis of polysuccinimide or copolymers of polysuccinimide to produce poly-$\alpha,\beta$-D,L-aspartic acid and salts of polyaspartic acid has been disclosed. For examples of such hydrolysis see U.S. Pat. Nos. 5,057,597, 5,221,733 and 5,315,010 to Koskan et al., and U.S. Pat. Nos. 5,288,783, 5,286,810 and 5,292,858 to Wood et al.

Polysuccinimide can be produced by the thermal polymerization of aspartic acid as has been described in U.S. Pat. Nos. 5,057,597 and 5,315,010 to Koskan et al.; by the polymerization of ammonium salts of maleic, fumaric and malic acids as described by Koskan et al. in U.S. Pat. Nos. 5,296,578 and 5,219,952, by Wood et al. in U.S. Pat. No. 5,288,783 and by Boehmke in U.S. Pat. No. 4,839,461; and by the microwave induced polymerization of ammonium salts of maleic, fumaric and malic acids as has been described in U.S. Pat. No. 4,696,981 to Harada et al.

The preparation of polysuccinimide by the thermal polymerization of maleamic acid is described in European Patent No. 593,187 (1994) to Groth et al.; by the phosphoric acid catalyzed thermal polymerization of aspartic acid is described by S. W. Fox et al. in *Arch. Biochem. Biophys.* 86, 274–280 (1960) and in U.S. Pat. No. 5,142,062 to Knebel et al.; by the thermal polymerization of aspartic acid in the presence of carbon dioxide gas is described in U.S. Pat. No. 5,329,020 to Kalota et al.; by the thermal polymerization of aspartic acid in the presence of solvents is described in French Patent No. 2,424,293 to Jacquet et al. and European Patent No. 578,449 (1994) to Paik et al.; and by the thermal polymerization of maleamic acid and ammonium salts of maleic and fumaric acid in the presence of processing aids as described in European Patent No. 593,187 (1994) to Freeman et al.

The hydrolysis of the polysuccinimide produced by each of the above methods results in polyaspartic acid solutions having varying degrees of color. In many instances, the physical properties and performance of the polyaspartic acid polymers themselves or polymer solutions are satisfactory but the products are too highly colored to be considered usable or suitable for use in color sensitive applications.

Copolymers of polysuccinimide can be produced by a variety of methods. The thermal polymerization of aspartic acid with a variety of co-monomers is described in German Patent Application DE 4,221,875 (1994) to Baur et al. Copolymers of polysuccinimide with diamines can be produced by the thermal polymerization of ammonium salts of maleic and fumaric acids with diamines as described in U.S. Pat. No. 5,286,810 to Wood et al.

Copolymers of polysuccinimide with amines can be produced by the reaction of amines with polysuccinimide in an organic solvent as has been described in U.S. Pat. No. 4,363,793 to Jacquet et al., British Patent UK 1,404,814 to Fujimora et al. and by P. Neri et al. in *J. Chem. Med.* 16, 893–897 (1973); or by the thermal polymerization of ammonium salts of maleic or fumaric acid with amines as described in U.S. Pat. No. 5,292,864 to Wood et al. However, as is the case with the polysucccinimide homopolymers, hydrolysis of the copolymers of polysuccinimide produces highly colored solutions of the copolymers of polyaspartic acid. Consequently, while the physical properties of the copolymers and/or their solutions may be satisfactory, they are not useful in color-sensitive applications.

Methods of preparing low-color solutions of polyaspartic acid have been described. For example, U.S. Pat. No. 5,292,864 to Wood et al. discloses preparing low-color solutions of the sodium salts of polyaspartic acid and copolymers of polyaspartic acid by the treatment of aqueous solutions of polyaspartates with decolorizing agents such as hypochlorite, chlorine, chlorine dioxide, hydrogen peroxide, a peroxycarboxylate or ozone.

However, the methods described by Wood et al. are unsatisfactory on several points. First, the use of chlorinated reagents is environmentally unacceptable. Second, the method described by Wood et al. requires an additional processing step to produce the low-color polyaspartates. The overall process as described by Wood et al., from monomer to final product, is a three step process. Third, in many instances treating the polyaspartate solutions with the decolorizing agents described by Wood et al. changes either the concentration or the pH of the solution, or both. Consequently, additional processing is required to compensate for these changes. These further processing requirements incur additional time and expense.

The art needs a new and improved method of producing low-color polyaspartates and polyaspartate solutions directly from polysuccinimides without the need for additional processing beyond the hydrolysis step already being used. Furthermore, the art needs a new and improved method which does not require the use of environmentally unacceptable chlorinated reagents or expensive ozone equipment.

SUMMARY OF THE INVENTION

An oxidative hydrolysis process is described for the preparation of low-color polyaspartate from polysuccinimides. The process comprises the hydrolysis of polysuccinimide homopolymers, copolymers thereof or homopolymer/copolymer mixtures thereof, in the presence of a selected oxidizing agent that does not contain chlorine.

More particularly, the oxidative hydrolysis process comprises the hydrolysis of polysuccinimide homopolymers, copolymers thereof or homopolymer/copolymer mixtures thereof at a temperature of about 55° C. to about 80° C. in the presence of a chlorine-free, non-chromogenic oxidizing agent. The preferred temperature for the hydrolysis is about 65° C. to about 70° C. The preferred oxidizing agents are selected from the group consisting of hydrogen peroxide, sodium perborate and hydrated perborates such as, for example, sodium perborate tetrahydrate or monohydrate, sodium percarbonate, sodium periodate, potassium periodate and peroxycarboxylic acids such as, for example, peracetic acid, perphthalic acid, persuccinic acid, permaleic acid and similar peracids. Potassium salts may be used in place of the sodium salts.

Solid, low-color polyaspartate homopolymers, copolymers thereof, homopolymer/copolymer mixtures thereof, or metal salts of the foregoing may be obtained by evaporating the resulting low-color polyaspartate solutions to dryness using conventional methods and equipment such as spray dryers, fluidized bed dryers, rotary tray dryers or other equipment.

A beneficial advantage of the process of the present invention for obtaining low-color polyaspartates over previous methods is that the invention allows one to obtain low-color polyaspartate solutions of high concentration directly from polysuccinimide without the need for an additional manufacturing or processing step. Therefore, the overall monomer-to-polyaspartate process is kept to two steps instead of the three or more steps required using the previous methods. This reduces the overall production costs of polyaspartates. An additional advantage is the process of the invention is that one can economically obtain low-color polyaspartate solutions, or solids from such solutions, without the use of environmentally undesirable chlorinated reagents or expensive ozone equipment.

Other and further aims, purposes, features, advantages, embodiments and the like will be apparent to those skilled in the art from the present specification and the appended claims.

DESCRIPTION OF THE INVENTION

Figure 1:
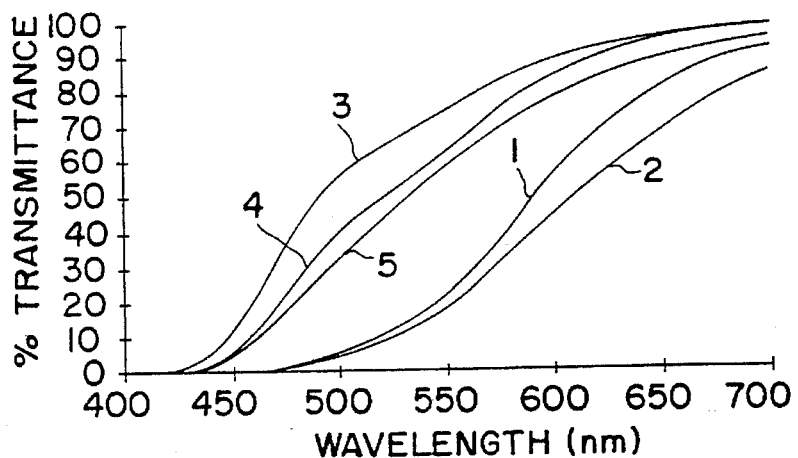
FIG. 1 is a graphical representation of the transmittance spectra obtained using the polyaspartate solutions prepared according to Examples 1, 2, 3, 4

The terms "low-color" and "low-color characteristics", as used herein refer to the color of polyaspartate homopolymer, copolymer or homopolymer/copolymer mixtures, and metal salts thereof, whether produced as solutions or solids by the oxidative hydrolysis process disclosed, relative to the color of a counterpart substance obtained by conventional hydrolysis in the absence of an oxidizing agent.

A process for the manufacture of low-color polyaspartate solutions comprises the hydrolysis of polysuccinimide homopolymers, copolymers or homopolymer/copolymer mixtures, and metal salts thereof, in the presence of a chlorine-free, non-chromogenic oxygen containing oxidizing agent. Low-color polyaspartates can be recovered from the produced solutions by evaporation to dryness.

The term "polyaspartate" as used herein refers to polyaspartic acid homopolymers, copolymers of aspartic acid with other functional monomers, mixtures of such homopolymers and copolymers and the salts of all such polymers and copolymers whether in solution or solid form. The term "Polyaspartate solution" includes mixtures of polyaspartate with inorganic bases, organic bases and ammonia.

In the case of the copolymers, the combined alpha-aspartate (α-aspartate) and beta-aspartate (β-aspartate) repeating unit (Asp1 and Asp2, respectively) content of the polymer may be from 10 to 100% on a molar basis. In the formulas of Asp1 and Asp2 shown below, M is a metal ion, ammonium ion or the conjugate acid of an organic base. The term "Polysuccinimide" as used herein refers to polymers or copolymers comprised of 10 to 100%, on a molar basis, of succinimide repeating units (Suc) prepared from any method.

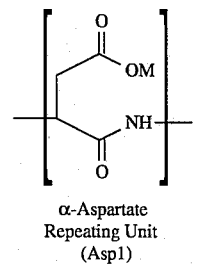

α-Aspartate
Repeating Unit
(Asp1)

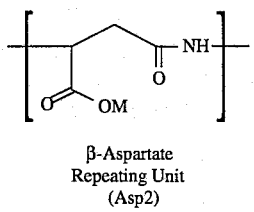

β-Aspartate
Repeating Unit
(Asp2)

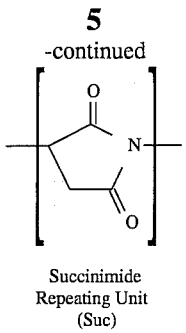

Succinimide
Repeating Unit
(Suc)

The oxidizing agents useful in practicing the method of this invention are generally chlorine-free, non-chromogenic but oxygen containing oxidizing agents. The preferred oxidizing agents are hydrogen peroxide, sodium perborate and hydrated perborates such as sodium perborate tetrahydrate and sodium perborate monohydrate, sodium percarbonate, which is the hydrogen peroxide adduct of sodium carbonate ($Na_2CO_3 1.5\ H_2O_2$), potassium percarbonate, sodium periodate, potassium periodate and peroxycarboxylic acids, such as peracetic acid, perphthalic acid, persuccinic acid, permaleic acid and like peracids. Oxidizing agents generally not useful in the practice of the present invention include reagents such as permanganate or cerium (IV) salts which are chromogenic, i.e., either they are themselves highly colored or produce colored by-products. Oxidizing agents such as a persulfate which decomposes to produce free radicals also are not suitable.

The concentration of oxidizing agents used in practicing the invention ranges in amount from about 0.1 wt % to about 30 wt %, based on the weight of polysuccinimide. The exact quantity of oxidizing agent used in practicing the invention will depend on the degree of color reduction required. Those skilled in the art, without undue experimentation, will be able to determine the quantity of oxidant to be used on the basis of the teachings and examples given herein. Likewise, the temperature at which hydrolysis is carried out and the hydrolysis time can be readily determined by following the teachings of the invention.

The oxidative hydrolysis of any polysuccinimide homopolymer or copolymer by practicing the oxidative hydrolysis processes described herein produces lower-colored polyaspartate or polyaspartate solutions than can be obtained by conventional hydrolysis methods. Polyaspartate solutions obtained by the method of this invention can be used directly or alternatively, the solutions can be evaporated to dryness to obtain solid polyaspartate.

Figure 2:
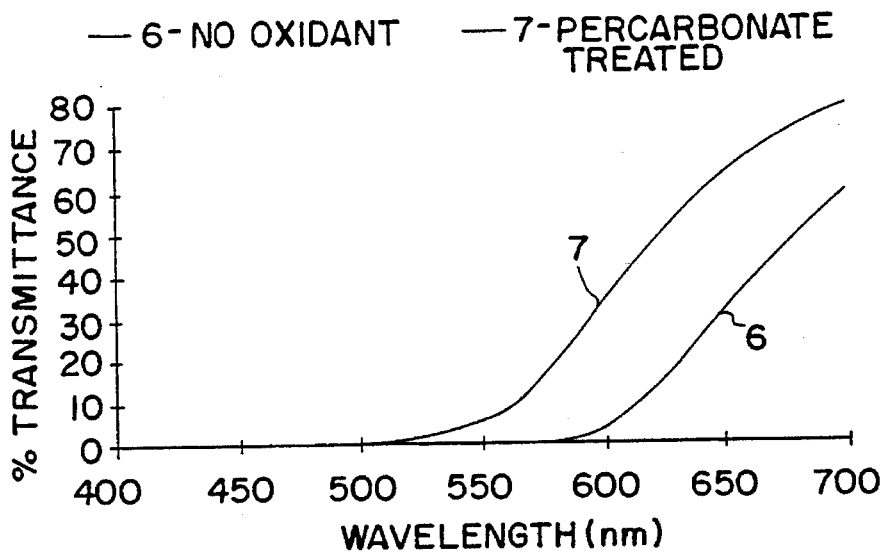
FIG. 2 is a graphical representation of the transmittance spectra obtained using the polyaspartate solutions prepared according to Examples 6 and 7.
Figure 3:
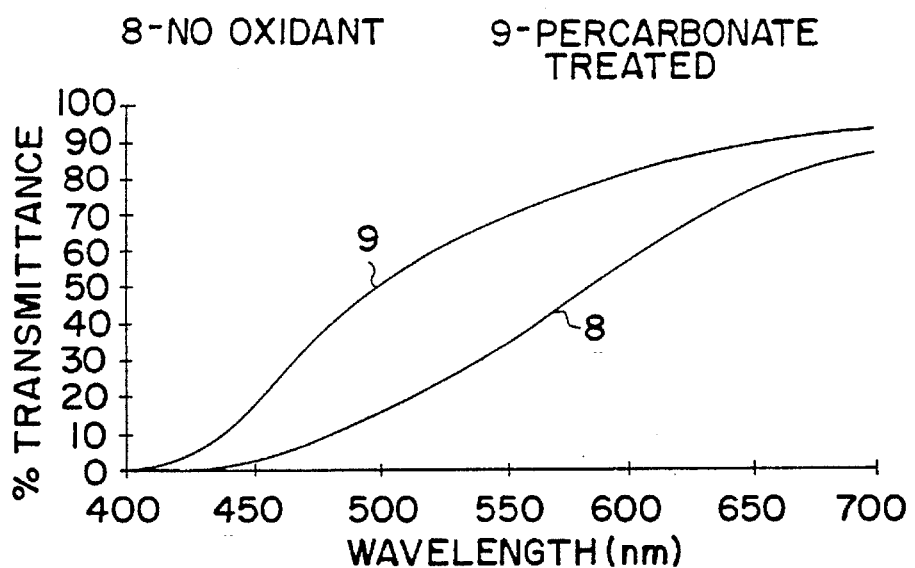
FIG. 3 is a graphical representation of the transmittance spectra obtained using the polyaspartate solutions prepared according to Examples 8 and 9.
Figure 4:
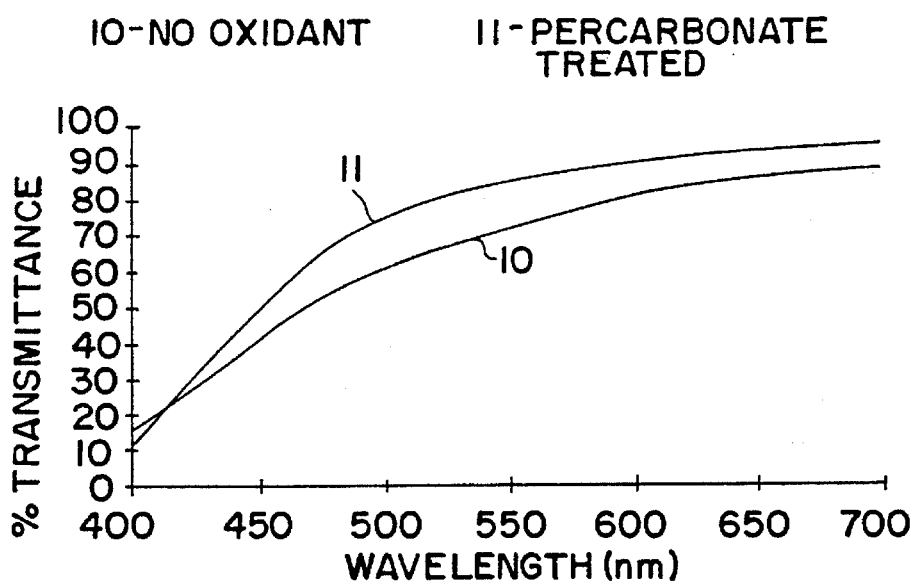
FIG. 4 is a graphical representation of the transmittance spectra obtained using the polyaspartate solutions prepared according to Examples 10 and 11.
Figure 5:
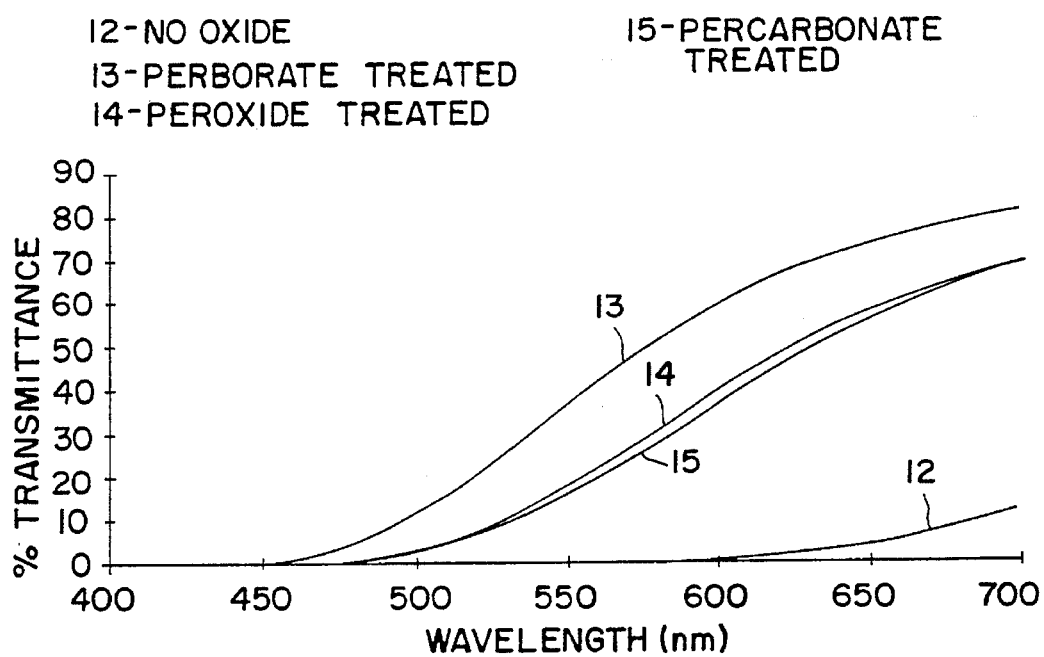
FIG. 5 is a graphical representation of the transmittance spectra obtained using the polyaspartate solutions prepared according to Examples 12, 13, 14 and 15.

The following Examples 1–15 and the FIGS. 1–5 illustrate the invention and are not to be construed as limiting or otherwise restricting the scope of the invention.

Methods and Materials

Five different polysuccinimides, denoted A, B, C, D and E, of varying molecular weight and varying intrinsic color were each hydrolyzed by practicing the process of the invention which utilizes an oxidizing agent during the hydrolysis step. For comparison, counterparts of each of the foregoing polysuccinimides were hydrolyzed by conventional methods which do not teach the use of an oxidizing agent during the hydrolysis step.

The weight average molecular weights (Mw) of the polysuccinimides used in the examples are as follows:

| | | |
|---|---|---|
| Polysuccinimide A | = | 4,500–5,000 |
| Polysuccinimide B | = | 1,800–2,000 |
| Polysuccinimide C | = | 13,000–14,000 |
| Polysuccinimide D | = | 3,500–4,000 |
| Polysuccinimide E | = | 30,000–35,000 |

For convenience in comparing the results, and not by way of limitation, hydrolysis was performed at a temperature of about 65° C. to about 70° C. for a total period of about 1 to about 1¼ hours. The color of the polyaspartate produced was both visually noted and instrumentally measured for comparison as described below in Example 16.

EXAMPLE 1

Hydrolysis of Polysuccinimide A in the Absence of an Oxidizing Agent.

A 10 gram (g) sample of Polysuccinimide A was slurried in 15 mL of water. A 7.5 g quantity of 50 wt % aqueous sodium hydroxide solution was added to the slurry at a temperature of about 65°–70° C. over a period of about 15 minutes. The temperature was then maintained at about 65°–70° C. for about 1 hour. The resulting orange colored solution of sodium polyaspartate had a pH of about 9.5 and a concentration of about 42 wt %. The weight average molecular weight of the sodium polyaspartate was about 5,258 as determined by Size Exclusion Chromatography (SEC).

EXAMPLE 2

Hydrolysis of Polysuccinimide A Using Sodium Persulfate.

This example demonstrates the undesirability of using an oxidizing agent which can generate free radicals.

A 10 g sample of Polysuccinimide A and 1.15 g of sodium persulfate were slurried in 15 mL of water. A 7.4 g quantity of 50 wt % aqueous sodium hydroxide solution was added to the slurry at a temperature of about 65°–70° C. over a period of about 15 minutes. The temperature was maintained at about 65°–70° C. for about 1 hour. The resulting orange-brown solution of sodium polyaspartate had a pH of about 9.8 and a concentration of about 42 wt %. The weight average molecular weight of the sodium polyaspartate was about 6,421 as determined by SEC.

EXAMPLE 3

Hydrolysis of Polysuccinimide A in the Presence of Hydrogen Peroxide.

In an oxidative hydrolysis method embodiment of the invention, a 10 g sample of Polysuccinimide A and 1.5 mL of 30 wt % hydrogen peroxide were slurried together in 15 mL of water. A 7.3 g quantity of 50 wt % aqueous sodium hydroxide solution was added to the slurry at a temperature of about 65°–70° C. over about 15 minutes. The temperature was maintained at about 65°–70° C. for about 1 hour. The resulting yellow solution of sodium polyaspartate had a pH of about 9.8 and a concentration of about 42 wt %. The weight average molecular weight of the sodium polyaspartate was about 4,558 as determined by SEC.

EXAMPLE 4

Hydrolysis of Polysuccinimide A in the Presence of Sodium Perborate.

In another oxidative hydrolysis method embodiment of the invention, a 10 g sample of Polysuccinimide A and 1 g sodium perborate tetrahydrate were slurried together in 15 mL of water. A 7.3 g quantity of 50 wt % aqueous sodium hydroxide solution was added to the slurry at a temperature of about 65°–70° C. over about 15 minutes. The temperature was maintained at 65°–70° C. for about 1 hour. The resulting yellow solution of sodium polyaspartate had a pH of about 9.9 and a concentration of about 42 wt %. The weight average molecular weight of the sodium polyaspartate was about 5,037 as determined by SEC.

EXAMPLE 5

Hydrolysis of Polysuccinimide A in the Presence of Sodium Percarbonate.

In an oxidative hydrolysis method embodiment of the invention, a 10 g sample of Polysuccinimide A and 0.4 g of sodium percarbonate were slurried in 15 mL of water. A 7.3 g quantity of 50 wt % aqueous sodium hydroxide solution was added to the slurry at a temperature of about 65°–70° C. over about 15 minutes. The temperature was maintained at 65°–70° C. for about 1 hour. The resulting yellow solution of sodium polyaspartate had a pH of about 9.4 and a concentration of about 42 wt %. The weight average molecular weight of the sodium polyaspartate was about 5,079 as determined by SEC.

EXAMPLE 6

Hydrolysis of Polysuccinimide B in the Absence of an Oxidizing Agent.

A 5 g sample of polysuccinimide B was slurried in 15 mL water. A 3.6 g quantity of 50 wt % aqueous sodium hydroxide solution was added to the slurry at a temperature of about 65°–70° C. over about 15 minutes. The temperature was maintained at 65°–70° C. for about 1 hour. The resulting deep red-brown solution of sodium polyaspartate had a pH of about 9.8 and a concentration of about 41 wt %. The weight average molecular weight of the sodium polyaspartate was about 2,264 as determined by SEC.

EXAMPLE 7

Hydrolysis of Polysuccinimide in the Presence of Sodium Percarbonate.

Practicing the oxidated hydrolysis method of the invention, a 10 g sample of Polysuccinimide B and 1.1 g of sodium percarbonate were slurried together in 15 mL of water. A 6.8 g quantity of 50 wt % aqueous sodium hydroxide solution was added to the slurry at a temperature of about 65°–70° C. over about 15 minutes. The temperature was maintained at about 65°–70° C. for about 1 hour. The resulting orange solution of sodium polyaspartate had a pH of about 9.7 and a concentration of about 43 wt %. The weight average molecular weight of the sodium polyaspartate was about 2,318 as determined by SEC.

EXAMPLE 8

Hydrolysis of Polysuccinimide C in the Absence of an Oxidizing Agent.

A 10 g sample of Polysuccinimide C was slurried in 15 mL of water. A 7.45 g quantity of 50 wt % aqueous sodium hydroxide solution was added to the slurry at a temperature of about 65°–70° C. over about 15 minutes. The temperature was maintained at about 65°–70° C. for about 1 hour. The resulting orange-yellow solution of sodium polyaspartate had a pH of about 9.8 and a concentration of about 41%. The weight average molecular weight of the sodium polyaspartate was about 14,982 as determined by SEC.

EXAMPLE 9

Hydrolysis of Polysuccinimide C in the Presence of Sodium Percarbonate.

Practicing an oxidative hydrolysis method embodiment of the invention, a 10 g sample of Polysuccinimide C and 0.4 g of sodium percarbonate were slurried together in 15 mL of water. A 7.2 g quantity of 50 wt % aqueous sodium hydroxide solution was added to the slurry at a temperature of about 65°–70° C. over about 15 minutes. The temperature was maintained at about 65°–70° C. for about 1 hour. The resulting orange solution of sodium polyaspartate had a pH of about 9.7 and a concentration of about 41 wt %. The weight average molecular weight of the sodium polyaspartate was about 14,502 as determined by SEC.

EXAMPLE 10

Hydrolysis of Polysuccinimide D in the Absence of an Oxidizing Agent.

A 10 g sample of Polysuccinimide D was slurried in 15 mL of water. A 7.45 g quantity of 50 wt % aqueous sodium hydroxide solution was added to the slurry at a temperature of about 65°–70° C. over about 15 minutes. The temperature was maintained at about 65°–70° C. for about 1 hour. The resulting yellow solution of sodium polyaspartate had a pH of about 9.8 and a concentration of about 42 wt %. The weight average molecular weight of the sodium polyaspartate was about 4,533 as determined by SEC.

EXAMPLE 11

Hydrolysis of Polysuccinimide D in the Presence of Sodium Percarbonate.

Practicing an oxidative hydrolysis method embodiment of the invention, a 10 g sample of Polysuccinimide D and 0.2 g sodium percarbonate were slurried together in 15 mL of water. A 7.3 g quantity of 50 wt % aqueous sodium hydroxide solution was added to the slurry at a temperature of about 65°–70° C. over about 15 minutes. The temperature was kept at about 65°–70° C. for about 1 hour. The resulting light yellow solution of sodium polyaspartate had a pH of about 9.8 and a concentration of about 42 wt %. The weight average molecular weight of the sodium polyaspartate was about 4,644 as determined by SEC.

EXAMPLE 12

Hydrolysis of Polyaspartate E in the Absence of an Oxidizing Agent.

A 10 g sample of Polysuccinimide E was slurried in 15 mL of water. A 7.4 g quantity of 50 wt % aqueous sodium hydroxide solution was added to the slurry at a temperature of about 65°–70° C. over about 15 minutes. The temperature was maintained at about 65°–70° C. for about 1 hour. The resulting dark brown solution of sodium polyaspartate had a pH of about 10 and a concentration of about 42 wt %. The weight average molecular weight of the sodium polyaspartate was about 32,087 as determined by SEC.

EXAMPLE 13

Hydrolysis of Polysuccinimide E in the Presence of Sodium Perborate.

Practicing an oxidative hydrolysis method embodiment of the invention, a 10 g sample of Polysuccinimide E and 1.8 g of sodium perborate monohydrate were slurried together in 15 mL of water. A 7.2 g quantity of 50 wt % aqueous sodium hydroxide solution was added to the slurry at a temperature of about 65°–70° C. over about 15 minutes. The temperature was maintained a about 65°–70° C. for about 1 hour. The resulting orange solution of sodium polyaspartate had a pH of about 10 and a concentration of about 42 wt %. The weight average molecular weight of the sodium polyaspartate was about 24,301 as determined by SEC.

EXAMPLE 14

Hydrolysis of Polysuccinimide E in the Presence of Hydrogen Peroxide.

A 3.0 g sample of Polysuccinimide E was slowly added to a solution of 1.2 mL of hydrogen peroxide, 7.2 g of a 50% (w/w) aqueous solution of sodium hydroxide, and 14 mL of water over a period of about 15 minutes at a temperature of about 65°–70° C. This temperature was maintained for about 1 hour. The resulting orange colored solution of sodium polyaspartate had a pH of about 9.8 and a concentration of about 42 wt %. The weight average molecular weight of the sodium polyaspartate was about 30,000 as determined by SEC.

EXAMPLE 15

Hydrolysis of Polysuccinimide E in the Presence of Sodium Percarbonate.

A 3.0 g sample of Polysuccinimide E was slurried in 15 mL of water. A 7.2 g quantity of a 50% (w/w) aqueous solution of sodium hydroxide, and an 0.8 quantity of sodium percarbonate were each added slowly and simultaneously to the slurry over a period of about 30 minutes at a temperature of about 65°–70° C. This temperature was maintained for about 1 hour. The resulting orange colored solution of sodium polyaspartate had a pH of about 10 and a concentration of about 42 wt %. The weight average molecular weight of the sodium polyaspartate was about 32,000 as determined by SEC.

EXAMPLE 16

Color Characteristics of Polyasparatate Produced by Oxidative Hydrolysis

The transmittance spectra of polyaspartate solutions from Examples 1–15 were obtained in the 400–700 nm (nanometer) wavelength region using a Shimadzu UV160U scanning spectrometer and 1 cm cuvettes. The reference was pure, deionized water which was assigned a value of 100% transmittance. Color analysis was performed using the methods established by the International Color Commission in 1931 (CIE 1931). The transmittance data were converted to the CIE Tristimulus Values X,Y,Z by Method 204B as given in the 15th Edition of "Standard Methods for the Examination of Water and Wastewater", published by APHA-AWWA-WPCF (1980). The CIE Tristimulus Values were converted to the CIE 1976 L*u*v* Space by standard equations as described in the chapter "Color", by Fred W. Billmeyer, Jr., in *Kirk-Othmer Encyclopedia of Chemical Technology*, 3rd Ed., V6, published by Wiley-Interscience, New York (1979).

The CIE L* value, which is the psychometric lightness value of color, is a measurement of how light or dark a color is, independent of hue. An L* value of 100 represents a completely colorless, transparent solution. An L* value of 0 (zero) represents a completely non-transparent, black solution. Therefore, higher values of L* signify lower color. The L* values for the polyaspartate obtained in Examples 1–15 are given in Table 1.

TABLE 1

Color of Polyaspartate Solutions Produced by Hydrolysis of Polysuccinimides (PS) A, B, C, D and E in the Presence and Absence of Oxidizing Agents

| Example | PS | Oxidizing Agent | Solution Hue | Solution L* Value |
|---|---|---|---|---|
| 1 | A | None | Orange | 61.6 |
| 2 | A | SP | Orange-brown | 56.5 |
| 3 | A | HP | Yellow | 89.5 |
| 4 | A | SPBT | Yellow | 84.5 |
| 5 | A | SPC | Yellow | 81.5 |
| 6 | B | None | Brown | 17.9 |
| 7 | B | SPC | Orange | 45.3 |
| 8 | C | None | Orange | 68.6 |
| 9 | C | SPC | Yellow | 86.7 |
| 10 | D | None | Yellow | 87.9 |
| 11 | D | SPC | Light Yellow | 93.5 |
| 12 | E | None | Dark Brown | 4.5 |
| 13 | E | SPBM | Orange | 68.8 |
| 14 | E | HP | Orange | 52.3 |
| 15 | E | SPC | Orange | 54.2 |

Legend:
PS = Polysuccinimide used in the Example.
SP = Sodium persulfate.
HP = Hydrogen peroxide.
SPBT = Sodium perborate tetrahydrate.
SPC = Sodium percarbonate.
SPBM = Sodium perborate monohydrate.

The data in Table 1 demonstrate that the hydrolysis of polysuccinimide in the presence of selected oxidizing agents as practiced in the method of this invention leads to lower-color polyaspartate solutions. That is, when a selected oxidizing agent is added to the hydrolysis step as taught herein, the L* value of the resulting polyaspartate solution obtained is higher than that of the corresponding L* value for the counterpart solution obtained when the oxidizing agent is omitted.

For example, L* values for Examples 3, 4 and 5, which practice the method of the invention, are higher that the L* value of Example 1 where no oxidizing agent was included during the hydrolysis step. Likewise, Examples 7, 9, 11 and 13–15, each of which practices the method of the invention, have higher L* values than counterpart Examples 6, 8, 10 and 12 which do not include the use of an oxidizing agent during the hydrolysis step. Example 2 demonstrates that not all oxidizing agents are useful in practicing the claimed invention. The low L* value obtained in Example 2 is believed due to the presence of radicals which can be generated by persulfate. These radicals in turn give rise to color bodies which lower the L* value.

FIGS. 1–5 graphically depict the transmittance spectra of the polyaspartate samples prepared according to Examples 1–15 and are the spectra from which the L* values of Table 1 were calculated. These spectra graphically illustrate the lower color achieved when polyaspartate solutions are prepared in the presence of an oxidizing agent. The samples which have higher light transmittance in the visible region of the electromagnetic spectrum, that is, from 400–700 nm, and are lower in color than samples with lower transmittance values. In all instances, the polyaspartate solutions prepared using an oxidizing agent during the hydrolysis step as taught herein transmit more light than samples prepared in the absence of the oxidizing agent.

The present invention has been described with respect to preferred embodiments but are not limited thereto. It would be apparent to one skilled in the art that the foregoing method illustrations are subject to numerous modifications which do not depart from the spirit and scope of this invention.

What is claimed is:

1. A method for preparing polyaspartate having low-color characteristics from oxidatively hydrolyzed polysuccinimide, said method comprising the step of hydrolyzing, in aqueous medium, polysuccinimide in the presence of a chlorine-free, non-chromogenic oxidizing agent for a time period sufficient to produce a solution of polyaspartate having said low-color characteristics.

2. The method of claim 1 further including the step of evaporating said polyaspartate solution to dryness and recovering said polyaspartate in solid form.

3. The method of claim 1 wherein the polyaspartate is a member of the group consisting of polyaspartic acid homopolymer, copolymer thereof, a homopolymer/copolymer mixture, and a salt of the acid homopolymer.

4. The method of claim 1 wherein the polysuccinimide is a member of the group consisting of polysuccinimide homopolymer, copolymer thereof, and homopolymer/copolymer mixture.

5. The method of claim 1 wherein said oxidizing agent is selected from the group consisting of hydrogen peroxide, sodium percarbonate, potassium percarbonate, sodium perborate tetrahydrate, sodium perborate monohydrate, sodium periodate, potassium periodate and peroxycarboxylic acids.

6. The method of claim 1 wherein the temperature during said hydrolysis is in the range of about 55° C. to about 80° C.

7. The method of claim 1 wherein the initial oxidizing agent concentration is about 0.1 wt % to about 30 wt % based on the weight of the polysuccinimide.

8. The method of claim 1 wherein the polysuccinimide is a copolymer having a polysuccinimide content of about 10 mole % to about 100 mole %.

9. The method of claim 1 wherein the temperature during said hydrolysis is in the range of about 65° C. to about 70° C.

* * * * *